United States Patent [19]

Kent

[11] 4,375,719

[45] Mar. 8, 1983

[54] APPARATUS FOR ASSEMBLING APERTURED MEMBERS ONTO AN ARRAY OF TERMINAL PINS

[75] Inventor: William C. Kent, Garland, Tex.

[73] Assignee: Western Electric Company, Inc., New York, N.Y.

[21] Appl. No.: 228,540

[22] Filed: Jan. 26, 1981

[51] Int. Cl.[3] ........................ B23P 19/00; H01R 43/00

[52] U.S. Cl. ........................................ 29/747; 29/759; 29/760; 29/825; 227/26; 227/28

[58] Field of Search ................. 29/747, 739, 759, 760, 29/844, 845, 884, 825; 227/26, 28

[56] References Cited

U.S. PATENT DOCUMENTS

| | | | |
|---|---|---|---|
| 3,157,721 | 11/1964 | Barish | 29/759 |
| 3,520,335 | 7/1970 | Patterson | 140/147 |
| 3,525,372 | 8/1970 | Haven | 140/147 |
| 3,687,172 | 8/1972 | Suverkropp | 140/147 |
| 3,924,325 | 12/1975 | Kufner | 29/747 |

*Primary Examiner*—Carl E. Hall
*Assistant Examiner*—P. W. Echols
*Attorney, Agent, or Firm*—R. P. Miller

[57] ABSTRACT

A connector housing (10) with projecting terminal pins (11) is moved through a set of blades (41-45) which act to align the columns of terminal pins. At an assembly area (38), a group of aligning pins (111) are advanced through openings in the blades to align the rows of terminal pins (11). A jaw device (62) advances an apertured block (13) into the position above the terminal pins, whereafter a pusher (103) advances an apertured retainer card (24) onto the block (13). A multi-fingered insertion tool (121) is moved to push the retainer card (24) and the block (13) onto the coordinately aligned terminal pins.

10 Claims, 10 Drawing Figures

118
117
106
66
103
75
102
104
62
101
73
67
9
74
68
38
88
89
23
69
13
10
13
86
87
76
85
92
82
91
64
63
81
13
83
77
84
9

117
114
113
45
44
43
42
41
47
27
11
116
10
111
112

118
106
117
103
102
104
114
113
111
116
45
44
43
42
41
47
27
87
89
124
121
122
123
82
91
92
81
83
5
5

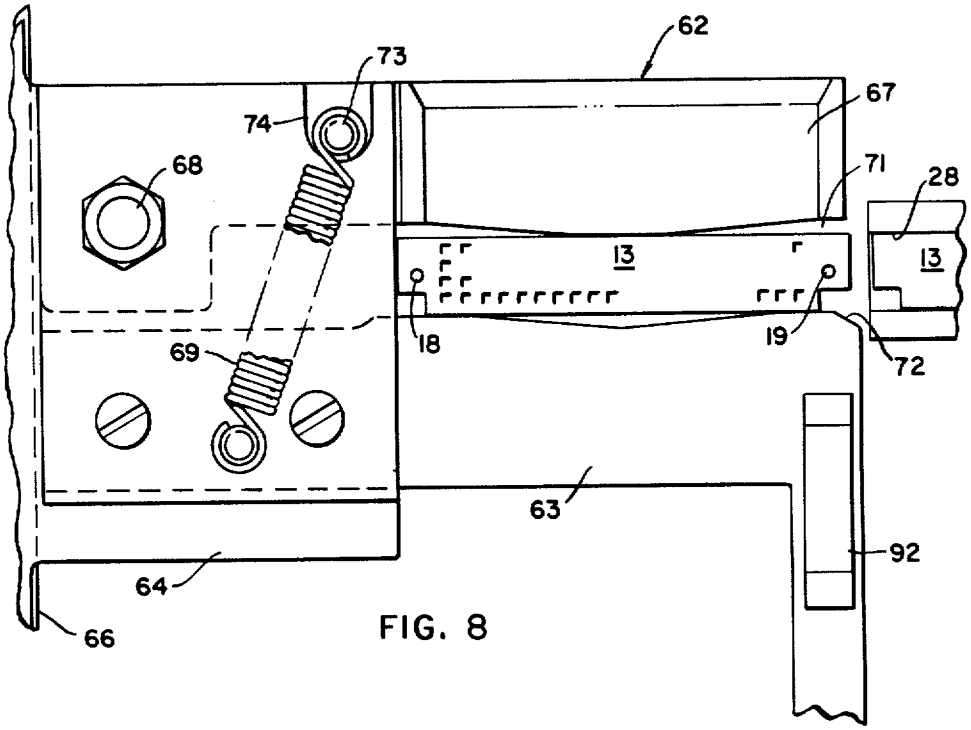
FIG. 8
FIG. 9
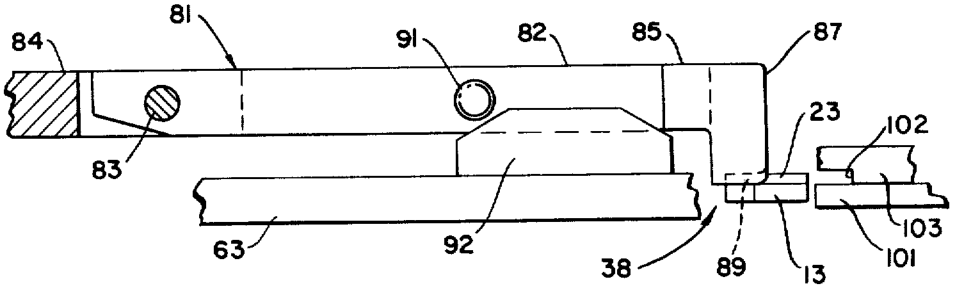

APPARATUS FOR ASSEMBLING APERTURED MEMBERS ONTO AN ARRAY OF TERMINAL PINS

FIELD OF THE INVENTION

This invention relates to apparatus for assembling apertured members onto an array of spaced pins and, more particularly, to an apparatus for assembling first and second members having coordinate arrays of apertures onto a coordinate array of terminal pins loosely projecting from a third member.

BACKGROUND OF THE INVENTION

In the manufacture of telephone switching and other complicated electrical equipment, extensive use is made of multitudes of relatively small circuit boards that are interconnected and mounted in frames or chassis. The interconnection is often accomplished by a pair of connectors, one of which is mounted or formed along one edge of each circuit board. The second connector has a socket for receiving the first or edge connector and may be provided with a coordinate array of terminal pins projecting from the backside thereof. Wires are run between the various connectors and are secured to the individual terminal pins by wire wrapping or soldering operations to electrically interconnect the circuit paths on the different circuit boards. A connector finding widespread use is one that is constructed by initially mounting a coordinate array of terminal pins in a socket-like base housing, and then assembling a base block with a coordinate array of holes on the terminal pins. This block is subsequently secured to the base housing to lock the terminal pins in the coordinate positions. Following assembly of a base block on the terminal pins, a fiber card retainer with coordinate arrays or holes is assembled on the terminal pins. This retainer is maintained in a position near the projecting ends of the terminal pins to retain the coordinate location of the ends of the pins during subsequent assembling operations.

Heretofore, connectors of this type have been, for the most part, manually assembled; a time consuming, tedious and expensive operation. The present invention is concerned with automatic facilities for aligning the terminal pins in a coordinate array and then assembling one or more members, such as a pin positioning block and a fiber retainer, on the coordinately aligned pins.

SUMMARY OF THE INVENTION

This invention contemplates, among other things, facilities for advancing a first article with a projecting array of pins into an assembly station whereat the pins are arranged and held in a coordinate array for subsequent assembly thereon of a pair of members, each of which has a coordinate array of apertures.

More particularly, the first article or connector housing is advanced into the assembly station while moving the columns of terminal pins through a series of parallel spaced blades having tapered forward edges which function to align and position the pins in straight columns. At the assembly station a series of pointed rods are moved through openings formed in the blades to align the rows of terminals into straight lines. Additional feed facilities are operated to move and hold a block having a coordinate array of holes over the ends of the coordinately positioned pins, whereafter a retainer card with a coordinate array of holes is moved onto the block with the coordinate arrays of holes in the respective connector components held in alignment. While the block and retainer are held in position a multi-fingered pusher is operated to move the block and retainer onto the pins so that the pins pass through the holes formed in the pushed block and retainer.

DESCRIPTION OF THE DRAWINGS

Other features and advantages of the present invention will be apparent upon consideration of the following detailed description in conjunction with the accompanying drawings, wherein FIG. 1 is an instructive diagram depicting the manner in which FIGS. 2A and 2B may be assembled to illustrate a top view of a coordinate pin aligning and connector component assembly apparatus embodying the principles of the present invention;

FIG. 8 is a top view of a spring-loaded holder for receiving and advancing the second connector component, and FIG. 9 is a side elevational view taken along line 9—9 of FIG. 2 showing a cam operated device for locating the third connector component in anticipation of an assembly operation.

Referring to FIG. 3, there is shown a connector base housing 10 with a plurality of terminal pins 11 projecting in a generally coordinate fashion. The pins are loosely mounted in slots and apertures 12 formed in the base housing or second member. These pins are constructed of material having good electrical properties but are susceptible to bending during assembly and handling. There is also shown a base block or first member 13 having a coordinate array of holes 14 and a pair of ears 16 and 17 with screw receiving openings 18 and 19 formed therein. The base block 13 may be assembled on the pins 11 by operation of the machine forming the subject matter of the present invention. Following assembly of the base block 13, self-threading screws may be inserted through a first pair of holes 20 and screwed into the opening 18 and 19 to secure the terminal pins in a precise coordinate array. The base housing 10 is also provided with a second pair of holes 21 and 22 through which screws may be passed to secure the connector to a printed circuit board or equipment frame. A retainer card or third member 23 having a coordinate array of holes 24 may also be assembled on the terminal pins 11 by the apparatus of the present invention.

Figures 2A, 2B:
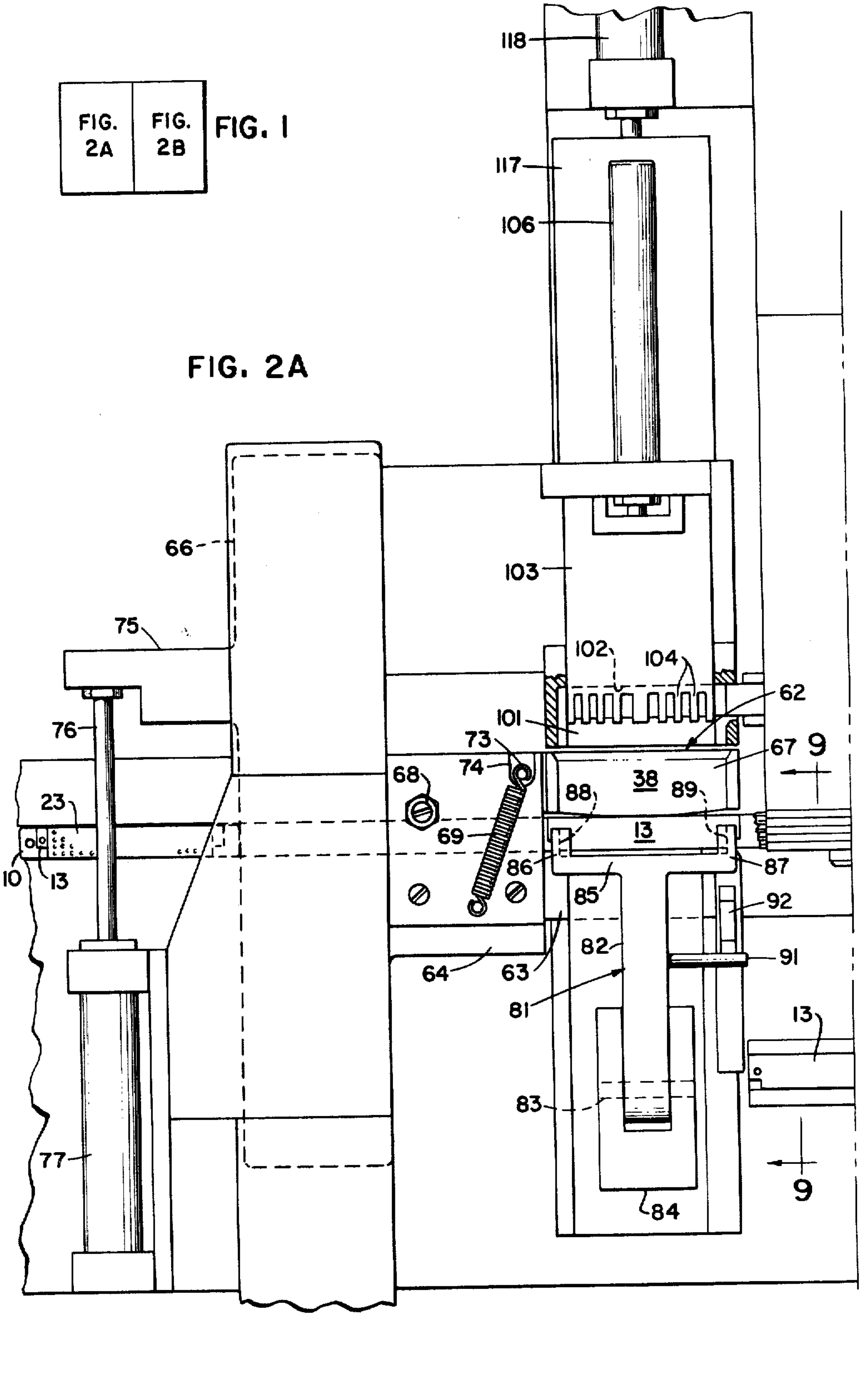
Figure 3:
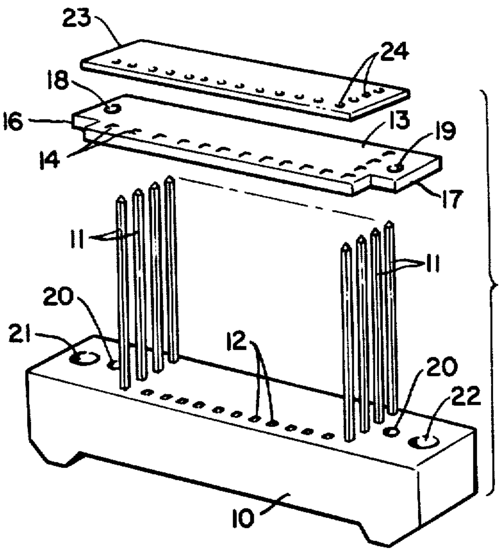
FIG. 3 is an exploded perspective view of the elements of a connector that may be automatically assembled by the apparatus of the present invention.

Considering the apparatus in general and referring to FIGS. 2A and 2B, connector components 10, 13 and 23 are advanced along trackways 26, 27 and 28 mounted on and secured to the frame for the overall assembly apparatus. Incremental motion is imparted to the respective components by commercially available feed mechanisms which incorporate a series of reciprocating part advancing pawls and spring-urged part retaining dogs. An example of one such feed mechanism is shown in FIG. 2B and includes an air cylinder 31 that is cyclically operated to reciprocate a spring-urged feed pawl 32 to advance the apertured blocks 13. Following each advance of the pawl 32, the advanced parts 13 are held from retrograde movement by a series of spring-urged dogs, such as the dog depicted by the reference numeral 33. Trackway 27 may lead to and from other connector assembly stations, while trackways 26 and 28 extend across the bottoms of magazines holding stacks 36 and 37 of connector components 13 and 23.

Figures 4, 6:
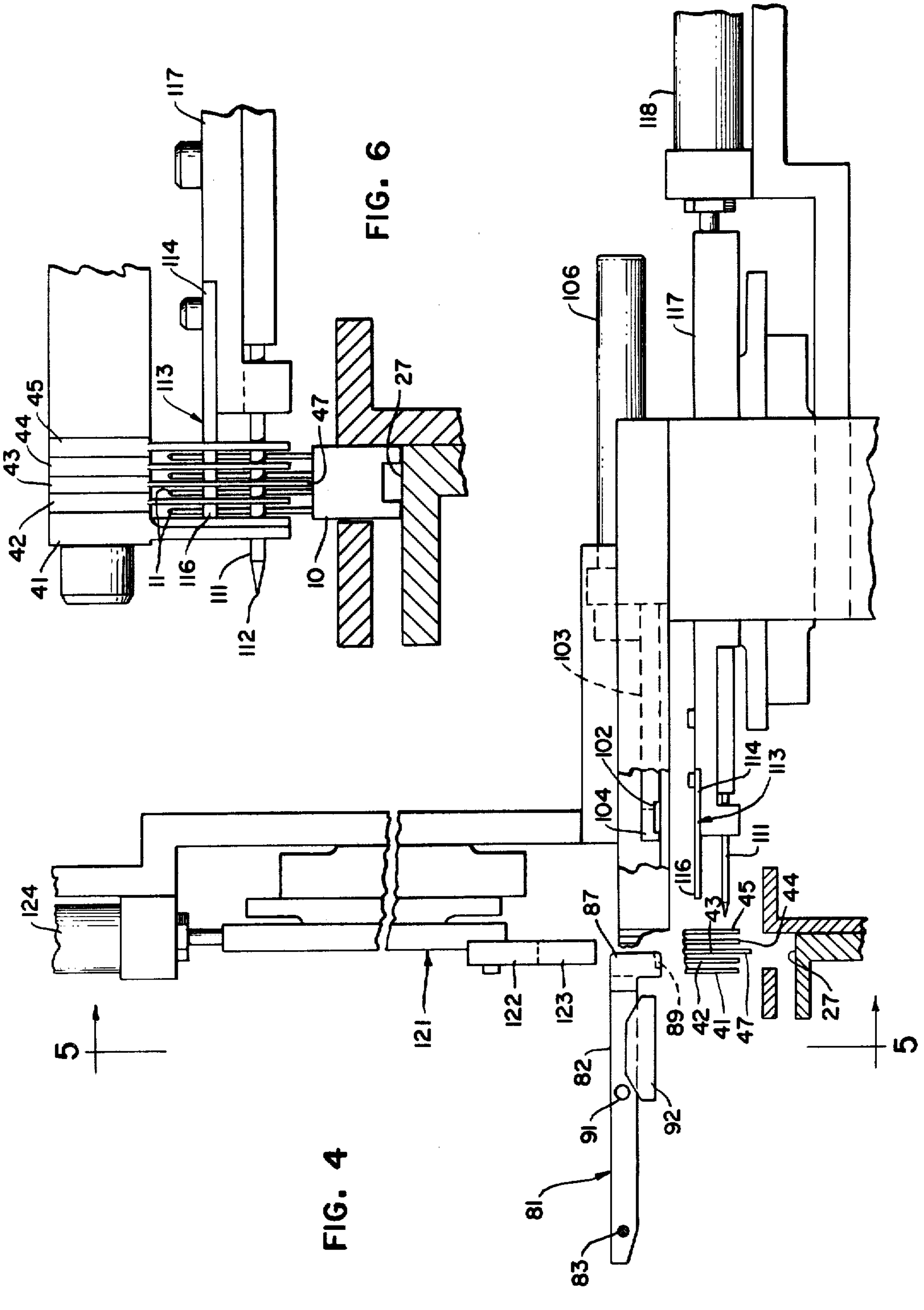
FIG. 4 is a sectional side view taken along line 4—4 of FIGS. 2A and 2B showing pointed rods for aligning rows of pins extending from a first of the connector components together with a pusher for moving second and third connector components onto the aligned pins.
FIG. 6 is an enlarged view of the row aligning rods shown in FIG. 4 with the rods advanced to align the rows of terminal pins.
Figure 5:
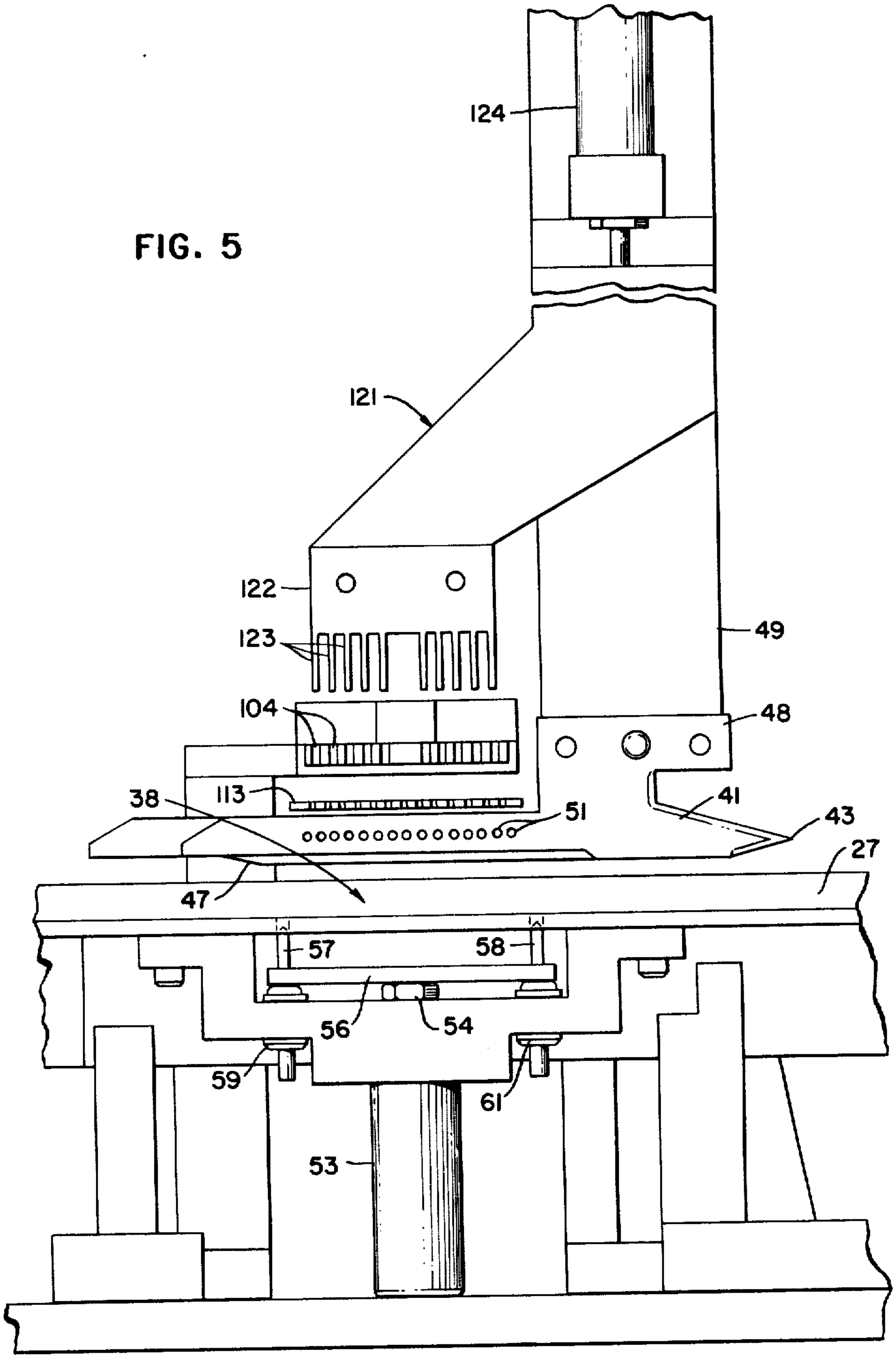
FIG. 5 is a front elevational view taken along line 5—5 of FIG. 4 showing a series of blades for aligning the columns of pins projecting from the first connector component.
Figure 7:
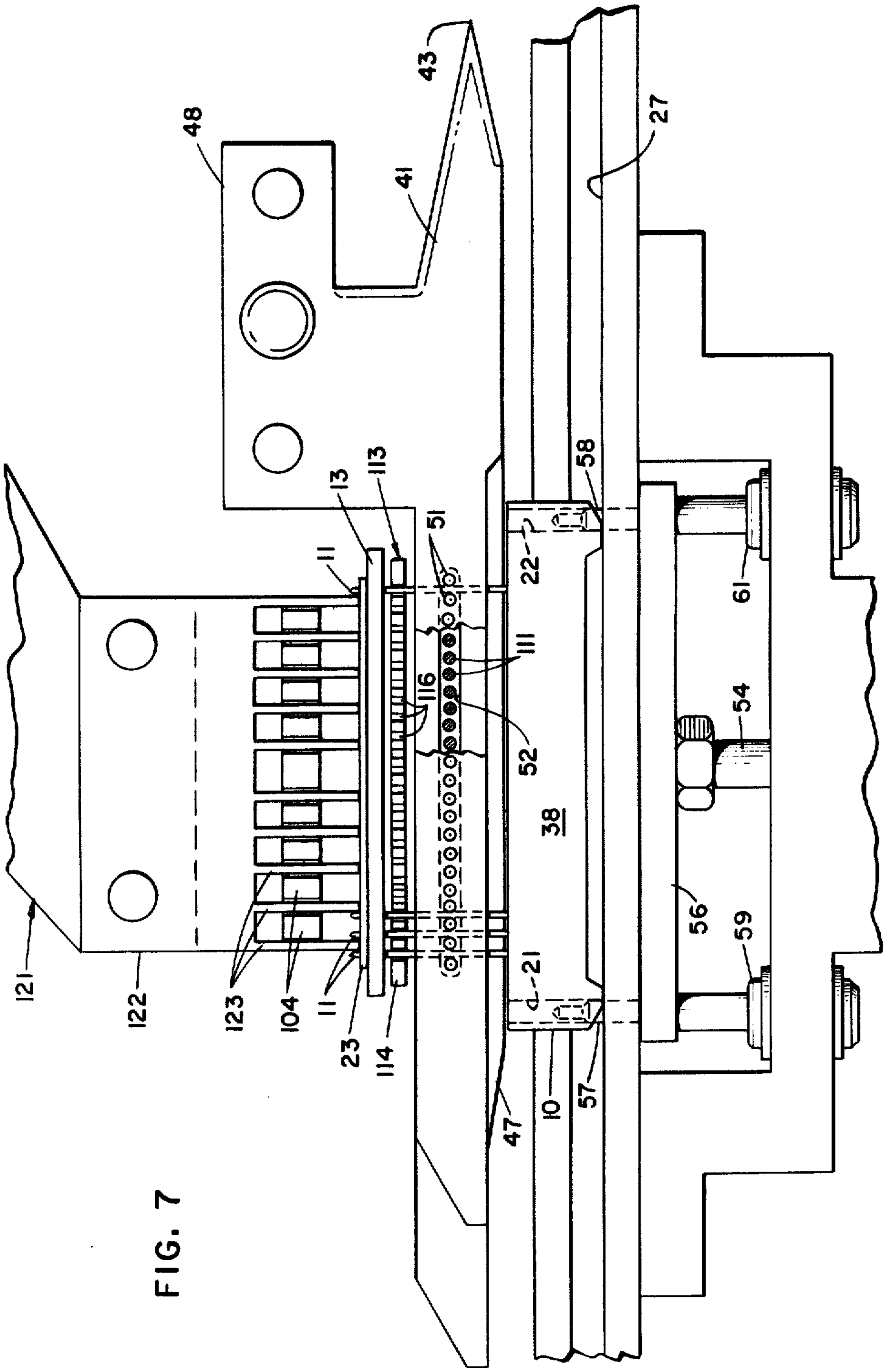
FIG. 7 is an enlarged front elevational view of the apparatus particularly illustrating the construction of the pin column aligned blades, the pusher for moving the apertured second and third connector components onto the coordinately aligned terminal pins, and facilities for holding the first connector component in a precise position.

As each connector housing 10 advances into the assembly area, generally designated 38, the four columns of projecting pins 11 are moved through spaces between a set of five column aligning blades 41, 42, 43, 44 and 45, see also FIGS. 5, 6 and 7. Each of the blades has tapered forward side edges similar to a knife blade to facilitate entry into the spaces between the advancing columns of terminals pins. The aligning blades are also beveled upwardly and downwardly at the forward extremities to provide substantially pointed ends which further facilitate the ease of the entry of the blades into the spaces between the advancing columns of terminal pins. The center blade 43 extends downwardly lower than the rest of the blades and presents a depending trailing section 47 which bears against the advancing housing to hold the housing 10 snugly against the bottom of the trackway 27, see particularly FIGS. 6 and 7.

It will be noted from FIG. 5 that the blades are provided with bracket sections 48 which are secured to a portion 49 of the frame for mounting the overall apparatus. Each blade has a trailing extremity extending back into the assembly area 38. The center blade 43 extends further back than the remaining blades to snugly hold the assembled connector exiting from the assembly area 38. The outer blade 41 is provided with a number of bores 51 which are aligned with the spaces between the rows of terminals when a connector base is positioned in the assembly area 38. The remaining blades 42, 43, 44 and 45 are provided with elongated slots 52.

When a connector housing 10 is advanced into the assembly area 38, an air cylinder 53 (see FIG. 5) is operated to advance a piston rod 54 to move a locator device toward the advanced housing. The locator device includes a yoke 56 and a pair of tapered locating pins 57 and 58 (see also FIG. 7). The locator pins 57 and 58 have lower sections riding in bushings 59 and 61 to assure precise vertical movement. The advancing locating pins 57 and 58 move into the screw openings 21 and 22 formed in the housing 10 to accurately position the housing in the assembly area 38.

Figure 2B:
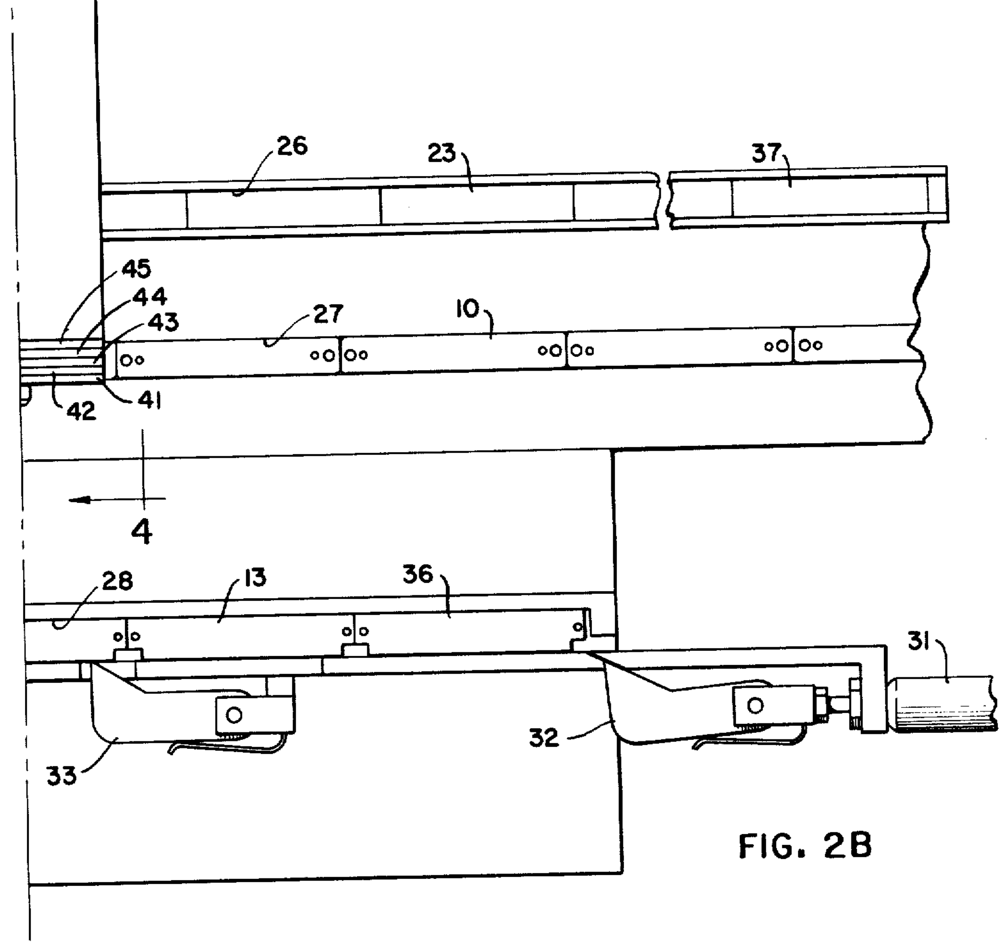

At the time that the housing 10 is positioned in the assembly area 38, a block 13 is pushed into a holder 62 (see FIGS. 2 and 8) comprising a jaw 63 attached by a bracket 64 to a slide 66. The holder 62 also includes an L-shaped jaw 67 pivotally mounted on a pin 68. The jaw 67 is urged toward the jaw 63 by a spring 69. It will be noted that the jaws 63 and 67 have beveled surfaces 71 and 72 to facilitate an entry of the block 13 between the jaws. In the empty position the holder 62 is held partially open by engagement of a pin 73 on pivot jaw 67 bearing against surface 74 of the bracket 64. Slide 66 has a projecting portion 75 attached to a piston rod 76 (see FIG. 2A) extending into a hydraulic cylinder 77.

Operation of hydraulic cylinder 77 moves the slide 66 to advance the holder 62 and the captured part 13 into the assembly area 38 in a position above the ends of the terminal pins 11. A device, generally designated by the reference numeral 81 (see FIGS. 2A, 4 and 9), for locating the retainer 23 in the assembly area 38 is mounted above the path of movement of the holder 62. This device includes a Y-shaped member having a stem 82 pivotally mounted on a pin 83 extending through a clevis 84. The locator includes a crossarm 85 and a pair of arm sections 86 and 87 having notches 88 and 89 for receiving and precisely locating a retainer 23 on top of the block 13.

Projecting laterally from the stem 82 is a cam follower pin 91 that rides on a linear cam 92 attached to the slide 66 for advancing the holder 62. Initially during the loading of the block 13 into the holder, the cam pin rides on a high portion of the cam 92 so that the arms 86 and 87 are held in an elevated position. When the holder 62 is advanced, the cam 92 is moved to present a low portion to the cam follower 91, whereupon the locator 81 pivots downwardly so that the arms 86 and 87 rest on the top side of the block 13 positioned in the assembly area 38.

During each connector assembly cycle, a retainer 23 is advanced onto a shelf 101 in registration with a rear wall 102 formed by a notch machined in a pusher 103. The pusher 103 is provided with a number of projecting fingers 104 spaced apart to be aligned with the spaces between the rows of terminal pins 11 positioned in the assembly area 38. Following the positioning of a block 13 in the assembly area and the pivoting of the locator arm sections 86 and 87 onto the top of the positioned block 13, the pusher 103 is slid forward by operation of a hydraulic cylinder 106 to advance a retainer 23 into the notches 88 and 89 which act to precisely locate the retainer 23 with respect to the block 13.

It will be recalled that when the connector housing 10 is advanced into the assembly area 38, the blades 41 to 45 aligned the columns of pins 11. Immediately after positioning a connector housing 10 in the assembly area, a group of row aligning or locator pins 111 (see FIGS. 4 and 6) having pointed ends 112 are advanced to move through the elongated slots 52 and the bores 51 formed in the blades 41–45. The advancing pointed rods 111 move between the rows of terminal pins 11 to accurately position these pins in a coordinate array corresponding to the coordinate array of holes formed in the block 13 and the retainer 23. To insure the exact alignment, a secondary pin placement member or comb 113 is provided. This member, as shown in FIGS. 6 and 7, includes a plate 114 having a plurality of projecting bevelled fingers or teeth 116. Both the pins 111 and the plate 114 are attached to a slide 117 operated by a hydraulic cylinder 118.

Positioned above the fingers 116 and the fingers 104 is an inserting tool 121 (see FIGS. 5 and 7) which includes a ram 122 having a plurality of spaced projecting inserting members 123. When the ram 122 is moved downwardly, by operation of a hydraulic cylinder 124, the inserting members 123 pass between the fingers 104 to press the retainer 23 against the block 13 whereupon the block 13 moves from between the jaws 67 and 63. The coordinate array of holes in the block 13 and the retainer 23 are aligned with the coordinately positioned terminal pins and, thus, these members are assembled onto the terminal pins, as shown in FIG. 7. The ram 122 is then withdrawn whereafter the aligning pins 111 and the locator comb 113 are withdrawn. The block holder 62 is then withdrawn and the cam 92 acting on the cam follower 91 lifts the retainer locator 81. The assembled connector with the block 13 and the retainer 23 mounted near the upper ends of the pins 11 is advanced from the assembly station 38 by the subsequent advance of another connector housing 10 into the assembly area.

Briefly in summary, a base housing 10 is advanced into the assembly area 38. As the housing 10 advances, the blades 41–45 align the columns of pins 11. When the housing moves into the assembly area, the trailing section 47 of blade 43 presses the housing against the bottom of the trackway 27. The air cylinder 53 (see FIG. 5) is operated to move the locator pins 57 and 58 into the screw openings 21 and 22 formed in the housing 10 to precisely position the housing in the assembly area. Next, the hydraulic cylinder 118 (see FIG. 4) is operated to move the pointed pins 111 and the locator fingers 104 between the rows of terminal pins 11 to precisely align the rows of terminal pins. The terminal pins are now in an exact coordinate orientation.

Now, a block 13 is advanced between the jaws 63 and 67 of the holder 62. Operation of hydraulic cylinder 77 (see FIG. 2A) follows, whereupon the holder 62 advances the block 13 into the assembly area 38 in a position above the aligned ends of the terminal pins 11. As the block 13 is moved into the assembly area 38, the locating device 81 is moved downwardly because the cam follower 91 rides off the high part of the cam 92. The ends of the locator device arms 86 and 87 are moved to rest on the top of the positioned block 13. Following advance of a retainer 23 from the trackway 26 onto the shelf 101, the hydraulic cylinder 106 is operated and the ram 103 with the pusher surface 102 slides the retainer onto the top of the jaw-held block 13. The forward corners of the retainer are moved into the notches 88 and 89 of the locator device 81. The block 13 and the retainer 23 are assembled on the terminal pins upon operation of the hydraulic cylinder 124 which moves the inserting members 123 downwardly to pass through the pusher fingers 104. This action causes the block 13 to be moved from within the jaws 63 and 67. The precisely aligned terminal pins 11 thus pass through the aligned holes formed in the block 13 and the retainer 23 which assume positions such as shown in FIG. 7.

The inserting members 123 are withdrawn by reversal of the operation of the hydraulic cylinder 124 whereafter the hydraulic cylinders 118, 106 and 77 are operated to respectively withdraw the pins 111, the pusher 103 and the jaw holder 62. As the jaw holder 62 is withdrawn, the cam 92 acts on the pin 91 to lift the locating device 81. The apparatus is now in condition for another cycle of operation.

The controls for sequentially operating the hydraulic cylinders 31, 77, 106, 118 and 124 may be any of a number of commercially available programmed sequencers, such as a PLC Programmable Controller sold by the Allan Bradley Company of Cleveland, Ohio. In the alternative, relay or cam control circuits may be utilized to effectuate the sequential control of the apparatus.

What is claimed is:

1. An apparatus for assembling a first member having a coordinate array of holes onto a coordinate array of pins projecting from a second member, which comprises:
   - a group of spaced blades for receiving columns of pins therebetween;
   - means for advancing a second member to move the column of pins between said blades;
   - a group of aligning pins mounted for movement transverse of said blades;
   - means for moving the aligning pins across said blades to captivate the projecting pins between the blades and the aligning pins;
   - means for releasably holding a first member above the captivated pins; and
   - means for pushing the first member from said holding means onto said captivated pins.

2. An apparatus for assembling a first member having a coordinate array of apertures onto a like coordinate array of rows and columns of pins loosely mounted in and projecting from a second member, which comprises:
   - a trackway for receiving a second member with the pins projecting up from the trackway;
   - a plurality of parallel blades positioned above said trackway for passage between rows of pins of a second member advanced along said trackway, each of said blades having tapered forward edges for initially passing through said column of pins;
   - a slide having a planar array of parallel, pointed rods projecting therefrom toward an outer one of said blades, said rods being spaced apart distances corresponding to the distances between the rows of pins;
   - said blades having openings therein to permit the passage of the pins therethrough;
   - means for advancing a second member along said trackway to advance the column of pins between said blades;
   - means for moving said slide to advance the rods through said blade opening and between said rows of pins to captivate the pins between the blades and rods; and
   - means for advancing a first member toward the second member to advance the apertures to receive the captivated pins.

3. An apparatus as defined in claim 2, wherein
   - one of said blades extends below the level of the bottom of the other blades, and the bottom forward section of said one blade is inclined toward the tapered edge thereof for engaging and forcing said advancing member to ride along the bottom of said trackway.

4. An apparatus as defined in claim 2, which comprises:
   - a comb having beveled teeth spaced apart distances equal to the spacings between the rows of pins; and
   - means for mounting said comb on said slide with the tips of said teeth set back from the tips of said pointed rods.

5. An apparatus for assembling a first member having a coordinate array of holes onto a coordinate array of terminals projecting from a second member, which comprises:
   - a plurality of blades mounted and spaced apart distances corresponding to the spacing between the columns of terminals;

means for advancing the second member to move the terminals between the blades with portions of the terminals projecting from the top of said blades;

a group of locating rods spaced apart distances corresponding to the distances between the rows of terminals;

said blades having openings therein aligned with said locating rods;

means for advancing the locating rods through said openings to align the rows of terminals;

means for releaseably holding a first member;

means for advancing said holding means to position the member with the holes therein aligned with the terminals positioned by said blades and locating rods; and means for pushing the first member from said holding means onto said terminals to insert the terminals in the holes formed in the first member.

6. An apparatus as defined in claim 5, wherein said blades are formed with tapered forward edges to facilitate entry of the column of pins between the blades.

7. An apparatus as defined in claim 5, which includes:

a trackway along which the second member is advanced; and one of said blades having a depending section which bears against the second member to hold said second member against the bottom of said trackway.

8. An apparatus as defined in claim 5, wherein said releaseable holding means includes a first jaw, a second jaw pivotally mounted on the first, and a spring for urging said second jaw toward the first jaw;

means for moving a first member between said jaws; and means for advancing said jaws to position the first member over the terminals projecting above the blades.

9. An apparatus as defined in claim 8, which includes:

a second pushing means;

means for positioning a third member in front of said second pushing means, said third member having a coordinate array of holes corresponding to the coordinate array of holes in the first member; and means for moving the second pushing means to advance a third member onto the top of the first member positioned over the terminals projecting above the blades whereafter said first defined pushing means acts against the third member to push said first and third members through said jaws onto the projecting terminals.

10. An apparatus as defined in claim 9, which includes:

a positioning device having a pair of notches for receiving the corners of a third member advanced onto the first member; and means activated by the movement of the jaws for moving the positioning device onto the first member as said first member is advanced over the projecting terminals.

* * * * *